United States Patent
Takahama et al.

(10) Patent No.: US 8,527,236 B2
(45) Date of Patent: Sep. 3, 2013

(54) DISPLACEMENT DETECTION APPARATUS AND METHOD OF CORRECTING ERROR OF SCALE USED FOR DISPLACEMENT DETECTION APPARATUS

(75) Inventors: Shinichiro Takahama, Matsudo (JP); Masahiko Igaki, Yokohama (JP); Yasuyuki Miyaoka, Yokohama (JP); Yasumichi Arimitsu, Yokohama (JP)

(73) Assignee: Canon Kabushiki Kaisha (JP)

( * ) Notice: Subject to any disclaimer, the term of this patent is extended or adjusted under 35 U.S.C. 154(b) by 271 days.

(21) Appl. No.: 13/111,103

(22) Filed: May 19, 2011

(65) Prior Publication Data
US 2011/0218760 A1    Sep. 8, 2011

Related U.S. Application Data

(63) Continuation of application No. PCT/JP2011/000249, filed on Jan. 19, 2011.

(30) Foreign Application Priority Data

Jan. 20, 2010 (JP) ................. 2010-009828
Jan. 19, 2011 (JP) ................. 2011-008424

(51) Int. Cl.
G01C 9/00 (2006.01)
G06F 11/30 (2006.01)

(52) U.S. Cl.
USPC ............ 702/150; 702/158; 702/182; 702/188

(58) Field of Classification Search
USPC ................... 702/150, 158, 182–188
See application file for complete search history.

(56) References Cited

U.S. PATENT DOCUMENTS 6,354,691 B1 * 3/2002 Uchikata ................. 347/37
2008/0106747 A1    5/2008 Kudo et al.

FOREIGN PATENT DOCUMENTS

| JP | 8063597 A | | 3/1996 |
| JP | 9175687 A | | 7/1997 |
| JP | 2000033739 A | | 2/2000 |
| JP | 3344614 B2 | | 11/2002 |
| JP | 2006160512 | * | 6/2006 |
| JP | 2006160512 A | | 6/2006 |
| JP | 2006048629 | * | 9/2006 |
| JP | 2006248629 A | | 9/2006 |

(Continued)

OTHER PUBLICATIONS

International Search Report, PCT/JP2011/000249, filed Jan. 19, 2011, PCT/ISA/210, 2 pages.

*Primary Examiner* — Phuong Huynh
(74) *Attorney, Agent, or Firm* — Rossi, Kimms & McDowell LLP (57) ABSTRACT

A displacement detection apparatus includes a scale 115 on which marks are disposed, first and second position detection sensors 111 and 112 detecting positions of the marks 110, and a processor 409 performing a calculation processing of an output signal from each of the first and second position detection sensors 111 and 112. The first and second position detection sensors 111 and 112 are disposed at a distance L from each other to be movable relative to the scale 115. The processor 409 calculates a correction value P' of a mark pitch P of the marks 110 using the distance L, a first time $T_{PK}$ required for K marks of the marks 110 to pass a detection position, and a second time $T_L$ required for a specific mark of the marks 110, which are measured at the same time of the first time $T_{PK}$, to move the distance L.

16 Claims, 7 Drawing Sheets

(56) References Cited

FOREIGN PATENT DOCUMENTS

| JP | 2006345254 A | 12/2006 |
|---|---|---|
| JP | 2008139283 A | 6/2008 |
| JP | 2006276064 A | 11/2008 |
| JP | 2008276064 A | 11/2008 |
| JP | 2009128071 A | 6/2009 |

* cited by examiner

DISPLACEMENT DETECTION APPARATUS AND METHOD OF CORRECTING ERROR OF SCALE USED FOR DISPLACEMENT DETECTION APPARATUS

CROSS REFERENCE TO RELATED APPLICATION

This is a continuation of International Application PCT/JP2011/000249, having an international filing date of 19 Jan. 2011, which claims priority to JP 2010-009828, filed 20 Jan. 2010 and JP 2011-008424, filed 19 Jan. 2011. The disclosures of the PCT application and the priority application, in their entity, including the drawings, claims, and the specifications thereof, are incorporated herein by reference.

BACKGROUND OF THE INVENTION

1. Field of the Invention

The present invention relates to a displacement detection apparatus that reduces an accumulated position error of a scale used for the displacement detection apparatus.

2. Description of the Related Art

An encoder (a displacement detection apparatus) is a device that reads periodic marks contained previously to calculate a relative displacement amount based on a product of a mark pitch and the number of the mark pitches. Because the accuracy of the mark pitch is converted into a displacement error directly, it is important to reduce a size error of the mark pitch in order to improve the accuracy of the encoder. However, even if the size error of the mark pitch is reduced, a scale recording the marks may be obliquely mounted on the apparatus and also the mark pitch may be expanded or contracted due to the mechanical stress or the temperature change in fixing and mounting the scale. Therefore, it is difficult to improve an accumulated position accuracy of the encoder.

Previously, the accuracy has been improved by performing a correction processing for a displacement measurement value that is measured by the encoder. For example, Japanese Patent Laid-Open No. H8-63597 discloses an accumulated error correction method that performs an accumulation calculation of a displacement of a measured value of a scale that is to be corrected with reference to a measured value of a highly-accurate standard scale to correct a scale pitch by a resolution of a detection apparatus when the accumulation amount is beyond a predetermined value. Japanese Patent Laid-Open No. 2006-345254 discloses a detection velocity measurement method that corrects velocity information containing an error of a mark pitch based on two position detection sensors at a distance of a known interval from each other.

However, in the configurations disclosed in Japanese Patent Laid-Open No. H8-63597 and Japanese Patent Laid-Open No. 2006-345254, it is necessary to previously prepare a highly-accurate standard scale in order to correct the accumulated position error of the mark pitch of the scale used for the displacement detection apparatus. In addition, it is necessary to configure the displacement detection apparatus which includes the highly-accurate standard scale along with this apparatus in order to estimate a mark pitch error or an accumulated position error value of the scale in a state of being mounted on the apparatus. In other words, it is necessary to correct the apparatus itself using the standard scale. In particular, when the scale is made of an inexpensive thin-film material, the linearity of the scale cannot be maintained and an amount of the mark pitch error is enlarged. This is caused by the scale meandering in a movable direction or expanding and contracting in accordance with an amount of tension for example. Furthermore, the mark pitch may always vary since the scale expands and contracts depending on the environment temperature change in accordance with the thermal capacity of the material. Accordingly, it is generally necessary to use the scale on which the mark pitch is recorded with high accuracy by using a material capable of suppressing the mark pitch error to the minimum.

BRIEF SUMMARY OF THE INVENTION

The present invention provides a displacement detection apparatus and an error correction method that reduce an accumulated position error of a scale used for the displacement detection apparatus.

A displacement detection apparatus as one aspect of the present invention includes a scale on which a plurality of marks are periodically disposed, a first position detection sensor and a second position detection sensor configured to detect positions of the marks, and a processor configured to perform a calculation processing of an output signal from each of the first position detection sensor and the second position detection sensor. The first position detection sensor and the second position detection sensor are disposed at a distance L from each other in a relative movement direction so as to be movable relative to the scale. The processor calculates a correction value P' of a mark pitch P of the plurality of marks using the distance L, a first time $T_{PK}$ required for K marks of the plurality of marks to pass a detection position by one of the first position detection sensor and the second position detection sensor, and a second time $T_L$ required for a specific mark of the plurality of marks, which is measured at the same time of the first time $T_{PK}$, to move the distance L.

A method of correcting an error of a scale used for a displacement detection apparatus as another aspect of the present invention is a method of correcting the error of the scale on which a plurality of marks are periodically disposed. The method includes detecting a position of the marks using a first position detection sensor and a second position detection sensor that are disposed at a distance L from each other in a relative movement direction so as to be movable relative to the scale used for the displacement detection apparatus, performing a calculation processing of an output signal from each of the first position detection sensor and the second position detection sensor, and calculating a correction value P' of a mark pitch P of the plurality of marks using the distance L, a first time $T_{PK}$ required for K marks of the plurality of marks to pass a detection position by one of the first position detection sensor and the second position detection sensor, and a second time $T_L$ required for a specific mark of the plurality of marks, which is measured at the same time of the first time $T_{PK}$, to move the distance L.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
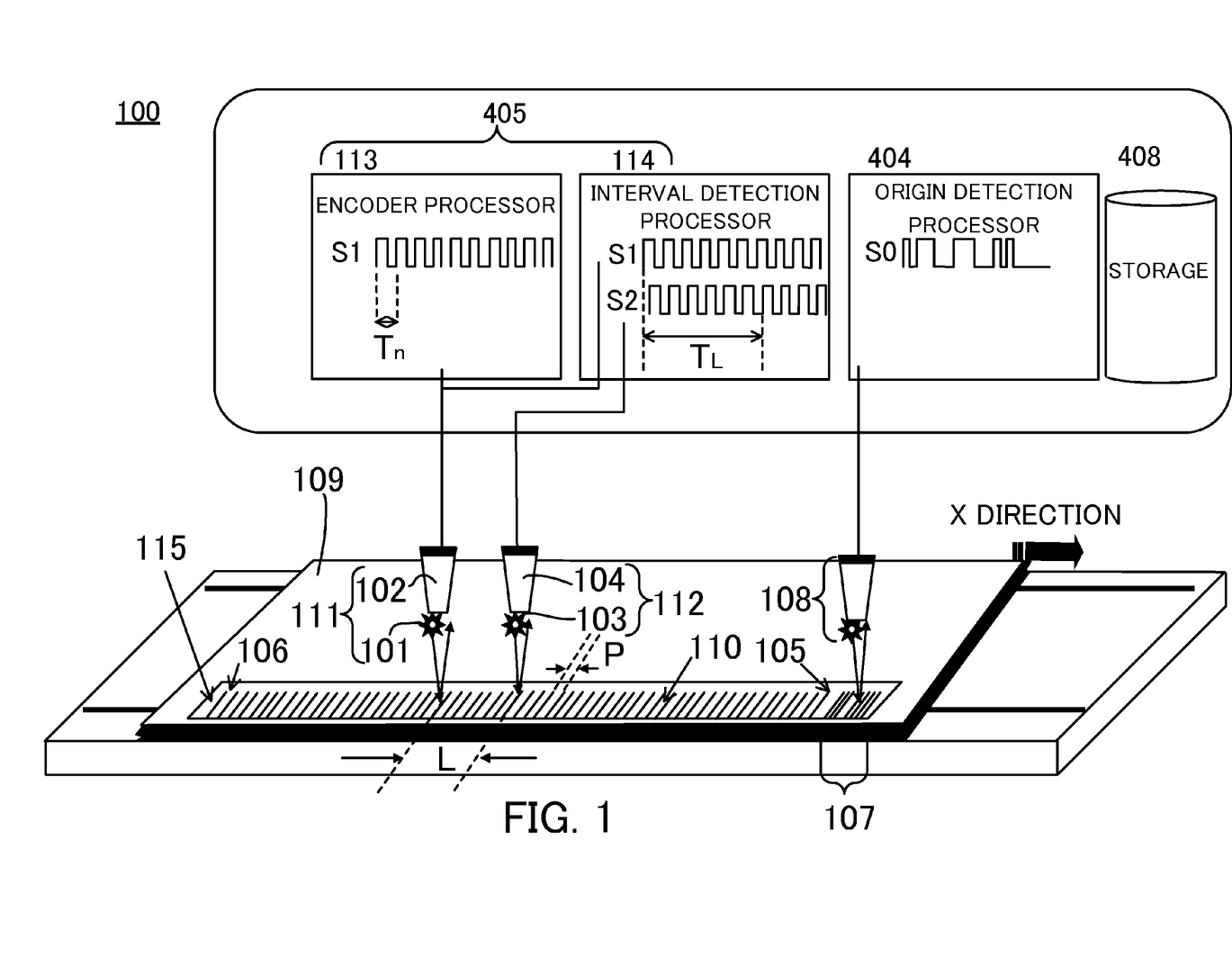
FIG. 1 is a schematic configuration diagram of a displacement detection apparatus in the present embodiment.

First of all, an outline of a displacement detection apparatus in the embodiment of the present invention will be described. The displacement detection apparatus in the present embodiment is configured to be able to perform a method of correcting an error of a scale used for the displacement detection apparatus in which a plurality of marks are periodically disposed. FIG. 1 is a schematic configuration diagram of a linear displacement detection apparatus 100 in the present embodiment. In the present embodiment, all of a first position detection sensor 111, a second position detection sensor 112, and an origin detection sensor 108 are optical reflection sensors. The first position detection sensor 111 and the second position detection sensor 112 emit light from a first light emitting element 101 and a second light emitting element 103, respectively. A reflected light is detected on a mark that is an object and a photoelectrically-converted signal is processed by a signal processor 405 described below to be able to detect a position of the mark. However, the position detection sensor of the present embodiment is not limited to the optical reflection sensor, and a position detection sensor based on another detection method such as an electric capacitance method, a magnetic method, an acoustic wave method, or the like may also be adopted. The combination of the methods can also be applied.

In the linear displacement detection apparatus 100, a slider 109 performs a linear reciprocating movement on a stage with a linear guide function in an arrow direction in FIG. 1. On the slider 109, a scale 115 (a scale used for the displacement detection apparatus) on which marks 110 are periodically disposed at a start point 105 to an end point 106 in a longitudinal direction are attached. The mark 110 has a configuration element including a reflection area on which a light from a light source is efficiently reflected and a non-reflection area alternately. The reflected light of the light illuminated from the first light emitting element 101 is photoelectrically converted by a first light receiving element 102 to be outputted as a first position detection signal S1. The first position detection sensor 111 is configured by including the first light emitting element 101 and the first light receiving element 102. Similarly, the reflected light of the light illuminated from the second light emitting element 103 for the mark 110 is photoelectrically converted by a second light receiving element 104 to be outputted as a second position detection signal S2. The second position detection sensor 112 is configured by including the second light emitting element 103 and the second light receiving element 104.

The first position detection sensor 111 and the second position detection sensor 112 are fixed on the stage with the linear guide function by a not-shown mechanism. On the other hand, the slider 109 moves as a movable portion relative to the first position detection sensor 111 and the second position detection sensor 112. The movement of the slider 109 is detected by the first position detection sensor 111 and the second position detection sensor 112. The moving time of the slider 109 is calculated by an encoder processor 113 and an interval detection processor 114 of the signal processor 405 based on the first position detection signal S1 and the second position detection signal S2.

In the present embodiment, as illustrated in FIG. 1, the mark pitch is defined as P (a nominal value), and a distance between the first position detection sensor 111 and the second position detection sensor 112 is defined as L. The first position detection sensor 111 and the second position detection sensor 112 are disposed at the distance L from each other in a relative movement direction (an X direction) so as to be movable relative to the scale 115. Values of the mark pitch P and the distance L are previously stored in a storage 408 as a reference value when calculating a displacement amount. In the present embodiment, the distance L is actually measured previously with high accuracy by a length measurement device such as a tool maker's microscope, but the present embodiment does not limit the configuration of the length measurement device. Then, the first position detection sensor 111 and the second position detection sensor 112 are fixed on a fixing portion of the linear displacement detection apparatus 100 so that a straight line defining the distance L is parallel to the movement direction.

As illustrated in FIG. 1, an origin mark 107 that indicates another reference position is disposed in front of the start point 105 of the mark. A position of the origin mark 107 is detected by the origin detection sensor 108, and is configured to be able to specify a reference position on the mark 110. The original mark 107 is, for example, configured by a luminous body, a reflector, a magnetic material, or a charged body.

The origin detection sensor 108 is, similarly to the first position detection sensor 111 and the second position detection sensor 112, fixed on a stage with a linear guide function by a not-shown mechanism. The origin mark 107 is a mark that is disposed on the scale 115 and that is optically readable, similarly to the mark 110. However, in order to distinguish the origin mark 107 from the other mark 110, the mark pitch is determined as a known variable pattern based on a shape of a signal pattern S0 detected by the origin detection sensor 108. The origin mark 107 may also be disposed at a position adjacent to the scale 115 instead of a position on the scale 115. The marks 110 are configured by containing numbers starting from one in order from the start point 105 to the end point 106 with respect to the reference position. When the origin detection sensor 108 is a sensor that has the same detection principle as those of the first position detection sensor 111 and the second position detection sensor 112, the origin may also be detected by using the first position detection sensor 111 and the second position detection sensor 112 instead of the origin detection sensor 108.

Next, a specific configuration of the scale 115 in the present embodiment will be described. The mark 110 is configured by the etching process of a thin film formed by the aluminum evaporation on a polyester resin that is a base material of the scale 115. The scale 115 on which the mark 110 is formed by this process is fixed on the slider 109 with a double-faced tape or adhesives. As a method of forming the mark, a method of irradiating a laser to evaporate or sublimate an evaporation film layer may also be adopted.

Next, the signal processor 405 and the origin detection processor 404 (a processor) will be described. The processor binarizes a photoelectrically-converted signal from each of the first position detection sensor 111, the second position detection sensor 112, and the origin detection sensor 108, and measures a detection time of each sensor to calculate a time difference required for the mark to pass each sensor. First of all, the first position detection sensor detects the first position detection signal S1 that is a binary signal. Then, the encoder processor 113 constituting the signal processor 405 calculates a pulse period $T_n$ of the first position detection signal S1. The second position detection sensor 112 detects the second position detection signal S2 that is a binary signal. Then, the interval detection processor 114 constituting the signal processor 405 calculates a time $T_L$ (a second time $T_L$) required for passing the same mark based on the first position detection signal S1 and the second position detection signal S2. The time $T_L$ is a time (a passing time of the distance L) required for a specific mark of the plurality of marks to move the distance L. It is preferable that the time $T_L$ is measured at the same time of a time $T_{PK}$ described below, and at least a part of a measurement time of the time $T_L$ and the time $T_{PK}$ is overlapped.

The origin detection sensor 108 detects the signal pattern S0 to obtain the origin mark 107. Then, the origin detection processor 404 provides numbers starting from one in order from a mark detected by the first position detection sensor 111 for the first time with reference to a position where a pattern of the origin mark 107 previously set coincides with the signal pattern S0 detected by the origin detection sensor 108. For example, if K marks 110 are included in the distance L between the first position detection sensor 111 and the second position detection sensor 112, the second position detection sensor 112 provides numbers starting from one in order with a delay of the K marks after the first position detection sensor 111 in accordance with the instruction of the processor. The origin detection sensor 108 does not necessarily provide the numbers in order starting from one for the head mark detected by the first position detection sensor 111 immediately after the detection of the origin mark 107. The position where the head position is set can be changed freely in accordance with the arrangement of each of the position detection sensors. Alternatively, the first position detection sensor 111 may be used instead of the origin detection sensor 108, and a mark obtained for the first time after the origin mark 107 is detected may be set as a first mark to scan marks sequentially in a whole area.

Figure 2:
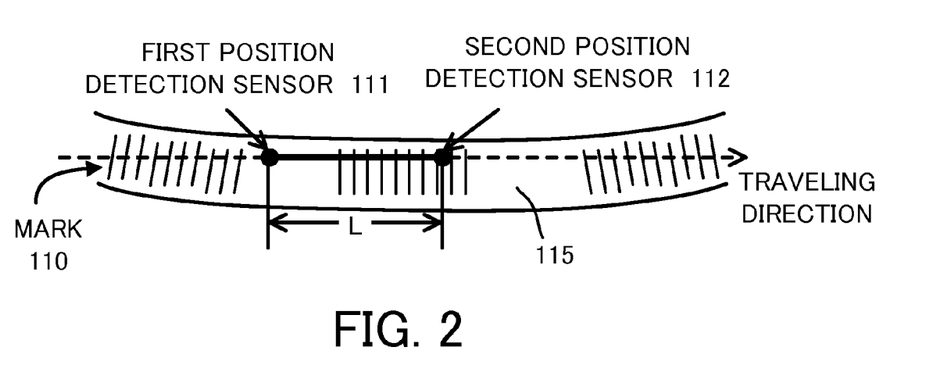
FIG. 2 is a diagram illustrating a variation of a mark pitch in accordance with mounting accuracy of a scale in the present embodiment.

Next, a variation of the mark pitch P due to the mounting accuracy of the scale 115 will be described. FIG. 2 is a diagram describing the variation, and it illustrates relative relations of positions of the first position detection sensor 111 and the second position detection sensor 112, the distance L, a traveling direction of the slider, and the mark 110. In the drawing, the scale 115 which is fixed in a meander shape with respect to the slider 109 is illustrated. As illustrated in FIG. 2, there is a case in which the mark pitch P is not uniform due to the meandering of the scale 115 in the movement direction in accordance with the process of mounting the scale 115 on the slider 109 and to the expansion in accordance with the adjustment of the tension. There is also a case in which the mark pitch P varies due to the expansion or the contraction in accordance with the thermal capacity of the slider 109. Therefore, in an encoder system using the mark 110, the generation of the error of the mark pitch is previously predicted. Generally, it is corrected using a profile of the mark pitch after the measurement of the mark pitch, or a scale made of a material that can suppress the error of the mark pitch to a minimum and that records the mark pitch with high accuracy is used.

On the other hand, the encoder system (the displacement detection apparatus) of the present embodiment is, as described above, especially aimed at a scale made of resin that can be manufactured at low cost. Even if there is a problem that the amount of the error of the mark pitch is large in the mounting process described above, the error is directly measured to be corrected to be able to reduce a position accumulated error.

Figure 3:
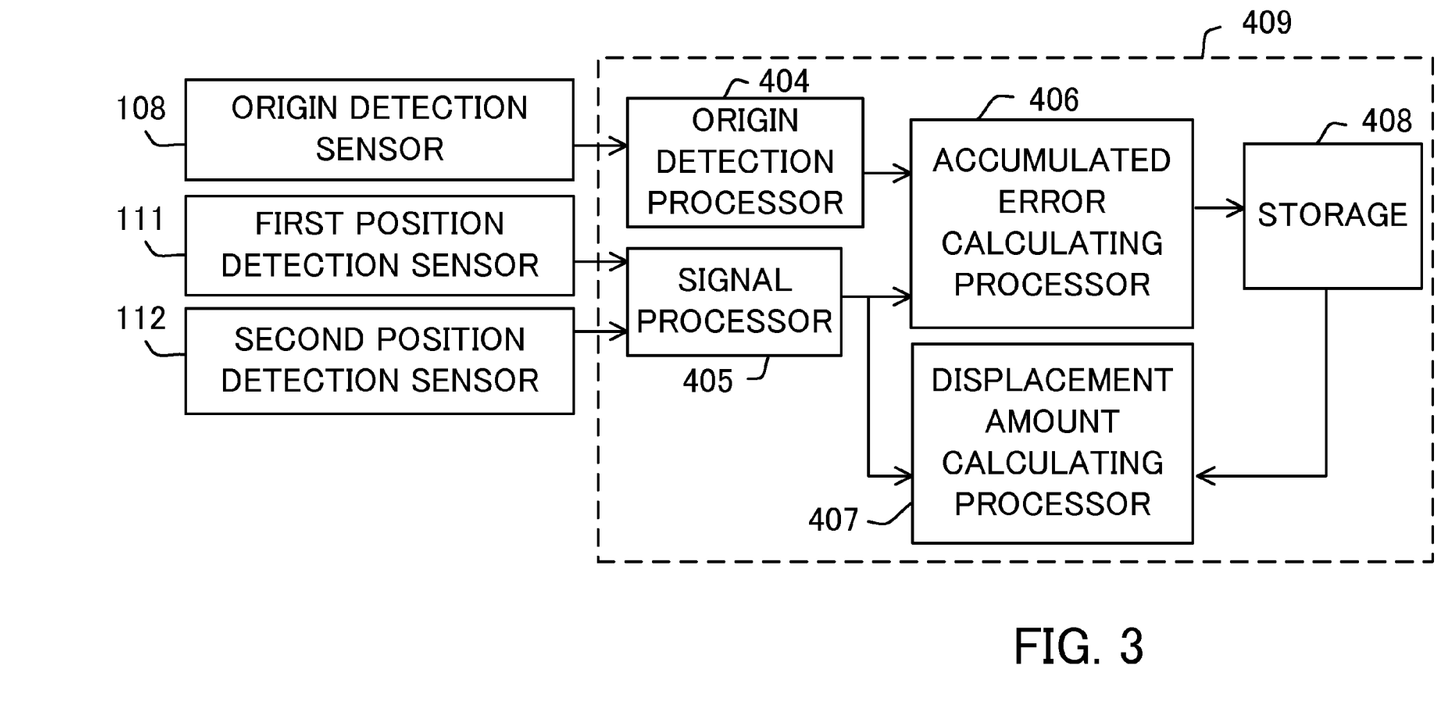
FIG. 3 is a block diagram of the displacement detection apparatus in the present embodiment.

Next, a correction processing by a linear displacement detection apparatus 100 in the present embodiment will be described. FIG. 3 is a block diagram of the linear displacement detection apparatus 100. The origin detection sensor 108 is provided to detect the origin mark 107 that is a reference position on the scale as described above, and the output signal is inputted to the origin detection processor 404. The first position detection sensor 111 and the second position detection sensor 112 are provided to detect the passing time of the distance L as described above, and the output signals are inputted to the signal processor 405. Reference numeral 406 denotes an accumulated error calculating processor that calculates an accumulated error of the mark pitch P based on the output of the signal processor 405. Reference numeral 408 denotes a storage that stores the calculation result of the accumulated error calculating processor 406 corresponding to a mark position. Reference numeral 407 denotes a displacement amount calculating processor that applies a correction value read from the storage 408 to calculate the corrected displacement amount. The origin detection processor 404, the signal processor 405, the accumulated error calculating processor 406, the displacement amount calculating processor 407, and the storage 408 constitute a processor 409. The processor 409 performs a calculation processing of the output signal from each of the first position detection sensor 111 and the second position detection sensor 112.

Figure 4:
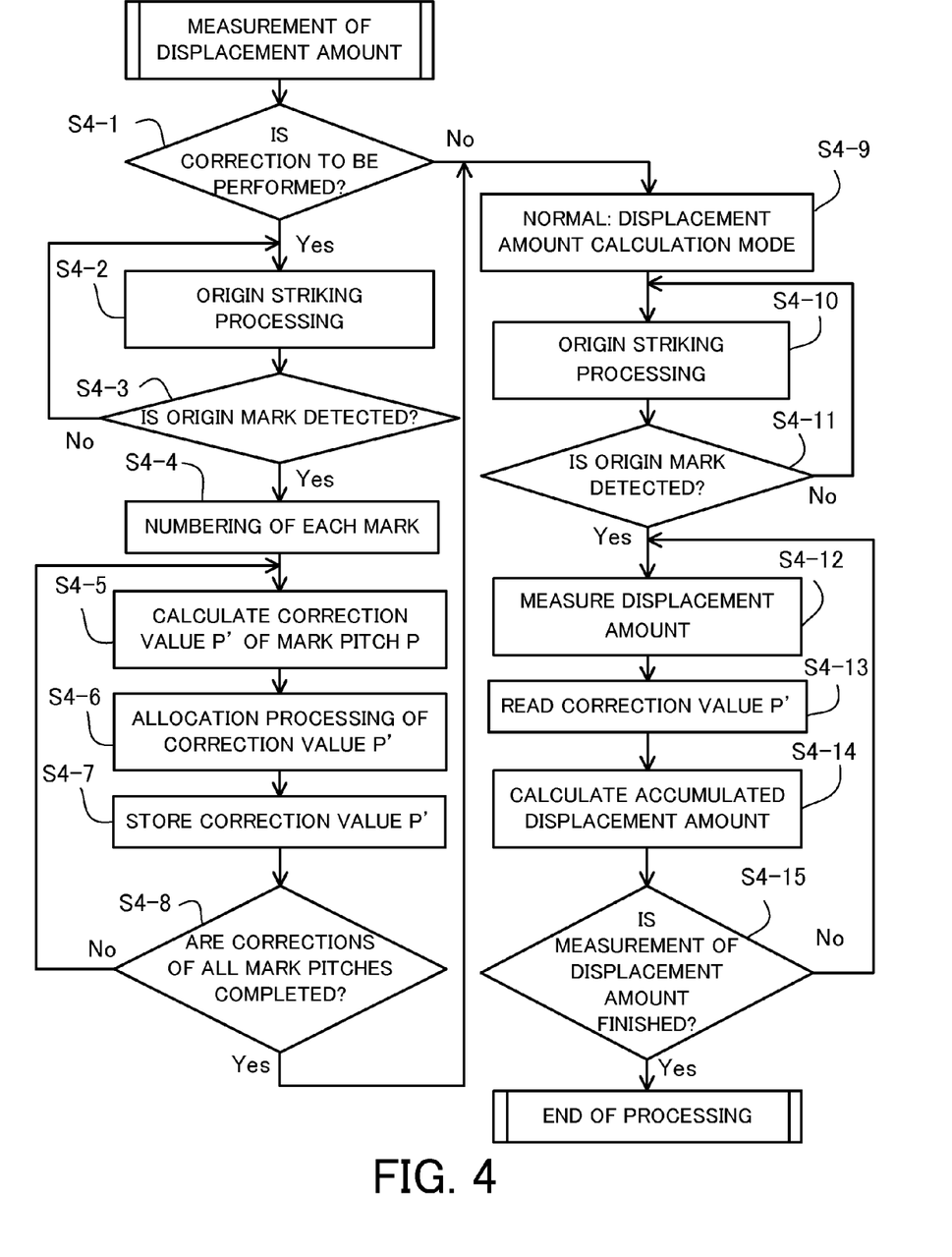
FIG. 4 is a flowchart of a method of correcting an error of a scale used for the displacement detection apparatus in the present embodiment.

Next, referring to FIG. 4, a correction processing operation performed by the linear displacement detection apparatus 100 of the present embodiment will be described. FIG. 4 is a flowchart of an error correction method (a displacement amount measurement method) of the scale used for the displacement detection apparatus in the present embodiment. Each step of FIG. 4 is performed based on an instruction of a controller (not shown) of the linear displacement detection apparatus 100. As an overall flow of the correction processing, first of all, an origin signal is detected in order to determine a mark number n of the mark 110. Next, the mark number n of each mark immediately after the origin position is detected. In other words, the processor 409 sets the mark number n of the mark which is detected by the first position detection sensor 111 for the first time to 1 after the position of the origin mark 107 is detected by the origin detection sensor 108. Then, the mark number n is added by one by one in order of the marks which are continuously detected to specify positions of the plurality of marks. The processor provides measurement data at the mark passing time for the mark number n of each mark, and determines a final correction value by the calculation processing based on the time data provided for every mark number n. The correction value P' of each mark number is stored in the storage 408. Hereinafter, it will be described using symbols illustrated in the flowchart of FIG. 4.

First, in Step S4-1, the controller of the linear displacement detection apparatus 100 determines whether or not it performs an error correction in measuring the displacement amount, in other words, whether or not it starts a correction operation. When the controller does not perform the error correction, the flow proceeds to Step S4-9. On the other hand, when the controller performs the error correction, it starts the correction operation to perform origin detection. In other words, in Step S4-2, the controller performs an origin striking processing to move the slider 109 to a mechanical origin position such as an origin of striking a mechanism. Subsequently, in Step S4-3, the controller determines whether or not it detects the origin mark. Specifically, the slider 109 starts the moving operation in one direction, and the origin detection processor 404 processes the output signal of the origin detection sensor 108 when the origin mark 107 passes the origin detection sensor 108 to detect and specify the origin mark 107.

When the origin mark is not detected in Step S4-3, the flow returns to Step S4-2. On the other hand, when the origin mark is detected, the numbering of each mark on the scale is performed in Step S4-4. Specifically, the output signal outputted from the first position detection sensor 111 is processed by the signal processor 405 to detect the passing time of the mark. The signal processor 405 binarizes the photoelectrically-converted detection signal by a predetermined threshold value in each position detection sensor, and performs a detection processing of an edge signal of the binary signal to perform the detection processing of the mark passing time. Along with detecting the mark passing time, the accumulated error calculating processor 406 performs the numbering processing of each mark which has passed. The accumulated error calculating processor 406 detects the time at which the same mark passes by the first position detection sensor 111 to perform the numbering processing for the mark for which the passing time is detected by the second position detection sensor 112 so that it has the same number as that numbered.

Subsequently, in Step S4-5, the accumulated error calculating processor 406 calculates the correction value P' of the mark pitch P. Specifically, the accumulated error calculating processor 406 detects the time on the detection signal which corresponds to a time at the same location of each mark based on the signal detected by the signal processor 405 to record the detection time corresponding to the numbered mark. The record of the detection time is performed for each of the detection signals of the first position detection sensor 111 and the second position detection sensor 112. The correction value P' of each mark pitch P is calculated based on the detection time of each mark obtained by the accumulated error calculating processor 406 and the mark number provided by the numbering of each mark. This calculation method will be described below with reference to FIG. 5. Then, in Step S4-6, the accumulated error calculating processor 406 performs an allocation processing of the correction value P', and determines the mark pitch P for which the correction value P' is to be allocated. This will be described below with reference to FIGS. 6A and 6B.

Subsequently, in Step S4-7, the correction value P' is stored in the storage 408. The determined mark pitch P and correction value P' are stored in the storage 408 associated with the mark number n. Then, in Step S4-8, the controller determines whether or not all the corrections of the mark pitches P are completed. Series of correction processings of the mark pitches P may be applied to all the marks on the scale or may be applied to a limited movable interval. Until all the correction processings of the applied mark pitches P are completed, each step of Steps S4-5 to S4-8 is repeated. The calculation operation of the error of the mark pitch is performed in Steps S4-5 to S4-8, and a velocity control is performed so that the slider 109 moves at a constant velocity during the series of operations.

On the other hand, when the corrections for all the applied mark pitches P are completed, the flow proceeds to Step S4-9 to move to a normal displacement amount calculation mode. In Steps S4-10 and S4-11, similarly to Steps S4-2 and S4-3 described above, the origin striking processing and the detection of the origin mark are performed. When the origin mark is not detected in Step S4-11, the flow returns to Step S4-10. On the other hand, when the origin mark is detected, the displacement amount calculating processor 407 actually measures the displacement amount in Step S4-12. The displacement amount calculating processor 407 reads out the correction value P' stored in the storage 408 in Step S4-13. Then, the displacement amount calculating processor 407 applies the correction value P' to the measured value of the displacement amount to calculate an accumulated displacement amount in Step S4-14. In other words, it adds the mark pitch P in order from the first mark using the correction value P' to calculate the accumulated displacement amount. In Step S4-15, the controller determines whether or not the measurement of the displacement amount is finished. When the measurement of the displacement amount is not finished, Steps S4-12 to S4-15 are repeated. On the other hand, when the measurement of the displacement amount is finished, the processing of measuring the displacement amount is finished.

Next, the error calculation processing of the accumulated error calculating processor 406 will be described in detail. First of all, a basic concept of the error calculation processing in the present embodiment is described briefly. Generally, when a moving velocity of an object is obtained, a method of detecting an interval velocity in which a time $T_L$ required for passing between two position detection sensors at a distance L from each other is measured to accurately obtain the moving velocity of the object based on the passing time and the distance L of the two position detection sensors is known. In the present embodiment, the object in the method of detecting the interval velocity is applied to the mark of the scale used for the displacement detection apparatus to obtain the moving velocity of the mark, i.e. the velocity of the moving object, and at the same time, the passing times of one or a plurality of marks are measured. Then, an accumulated length of the counted one or the plurality of marks is calculated. The error calculation processing of the present embodiment has a basic concept in which the error calculation of the mark pitch or the calculation of the corrected mark pitch using this calculation result to reduce the accumulated position error in a whole range of the scale length.

Figure 5:
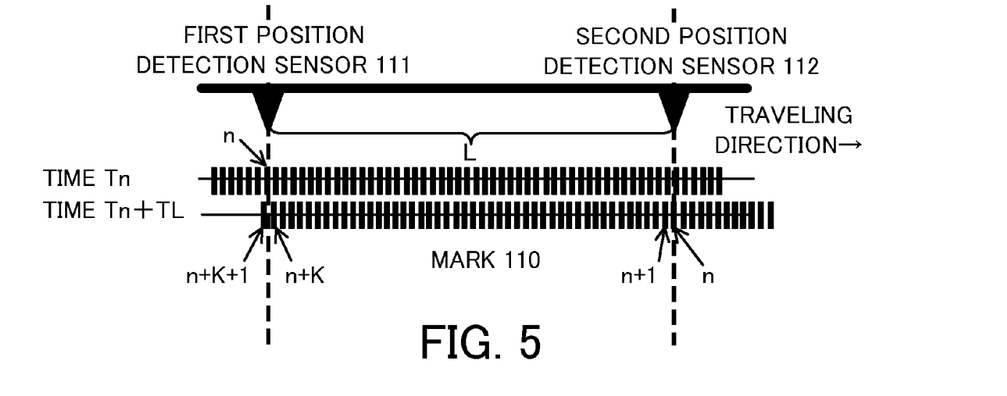
FIG. 5 is a diagram of an error calculation processing performed by an accumulated error calculating processor in the present embodiment.

Hereinafter, based on the concept described above, a processing method of calculating the corrected mark pitch that is the error calculation processing of the accumulated error calculating processor 406 will be described in detail with reference to FIG. 5. First of all, in order to obtain the moving velocity of the moving object accurately, a time difference (the time $T_L$) between a time $T_n$ at which an n-th mark passes the first position detection sensor 111 and a time $T_n+T_L$ at which the n-th mark passes the second position detection sensor 112 is measured. Since the distance of the movement between the time $T_L$ is the distance L, $V_L=L/T_L$ is met where $V_L$ is an average velocity at this time. At the same time, the first position detection sensor 111 is in a state where K+1 marks from the n-th mark to the (n+K)th mark have passed during the time $T_L$.

In the embodiment, a nominal value of the mark pitch is defined as P, and a distance between the n-th mark and an (n+1)th mark is defined as $P_n$. A time from a time at which the first position detection sensor 111 detects the n-th mark until a time at which the first position detection sensor 111 detects the (n+1)th mark, i.e. a time required for detecting the mark pitch $P_n$, is defined as $T_n$. In this case, a time $T_{PK}$ (a first time $T_{PK}$) from a time at which the n-th mark is passed until a time at which the (n+K)th mark is passed is represented as $T_n+T_{n+1}+\ldots+T_{n+K-1}$. The time $T_{PK}$ is a time required for the K marks of the plurality of marks to pass a detection position by the first position detection sensor 111. The K marks are for example marks contained in the distance L, but the present embodiment is not limited to this. When the average velocity (the moving velocity) in this case is $V_p$, an accumulated distance from the mark pitch $P_n$ to the mark pitch $P_{n+K-1}$ is represented as the following Expression (1).

$$\sum_{i=1}^{K} P_{n+i-1} = V_p \sum_{i=1}^{K} T_{n+i-1} \quad (1)$$

As described above, since the average velocity $V_p$ (the moving velocity) in this case is represented as $V_L=L/T_L$, Expression (1) described above is represented as the following Expression (2).

$$\sum_{i=1}^{K} P_{n+i-1} = \frac{L}{T_L} \sum_{i=1}^{K} T_{n+i-1} \quad (2)$$

Furthermore, since Expression (2) described above is an accumulated value of K mark pitches, an average pitch per one mark is represented as the following Expression (3)

$$\frac{1}{K}\sum_{i=1}^{K} P_{n+i-1} = \frac{L}{K \cdot T_L} \sum_{i=1}^{K} T_{n+i-1} \quad (3)$$

As Expression (3) described above, the correction value P' of the mark pitch P is calculated by multiplying a moving distance $T_{PK}L/T_L$ at the moving velocity $L/T_L$ during the time $T_L$ by 1/K. Therefore, even if there is a pitch variation, each average pitch can be sequentially calculated based on the distance L and the time $T_L$ required for passing the interval.

The distance L and the distance that the K marks pass do not strictly coincide with each other. Therefore, when the velocity variation exists in an actual control system, the average velocities $V_P$ and $V_L$ do not strictly coincide with each other. However, according to the simulation result of the present inventor, as described below with reference to FIGS. 7A and 7B, the accumulated position error can be effectively reduced.

In the present embodiment, the correction value P' of the mark pitch P can also be calculated by multiplying the moving distance $T_{PK}L/T_L$ during the time $T_{PK}$ by $T_P/T_{PK}$ using the passing time $T_P$ of a predetermined mark pitch P. In the present embodiment, the passing time of the K marks is detected by using the first position detection sensor, but the similar detection can also be performed by using the second position detection sensor.

As described above, the accumulated calculation of the K mark pitches P can be performed based on the calculation processing using the distance L between the position detection sensors, the time $T_L$ required for the same mark between the position detection sensors to move between the position detection sensors, and the time $T_{PK}$ required for the K marks to pass the position detection sensor. Accordingly, the distance L between the position detection sensors, the time $T_L$ required for the same mark to move between the position detection sensors, and the time $T_{PK}$ required for the K marks to pass the position detection sensor at the same time can be calculated based on the detection time, detected by each position detection sensor, for each mark where the numbering has been performed. Therefore, the processor can calculate the correction value P' of the mark pitch P of the plurality of marks using the distance L, the time $T_{PK}$, and the time $T_L$. This calculation processing, i.e. the calculation processing represented by Expression (3) as described above is performed by the accumulated error calculating processor 406. The obtained calculation result is stored in the storage 408 corresponding to the numbered mark. The above processing is sequentially performed corresponding to a mark period detected in accordance with the movement operation, and all the mark pitches at an arbitrary passing position of the position detection sensor from the start point to the end point of the marks on the scale are recorded.

As above, the correction processing operation and the correction processing in the present embodiment is described. In using the displacement detection apparatus actually, with respect to the displacement amount calculating processor 407 of FIG. 3, a correction value of a mark pitch previously stored based on the first mark pitch is used as an actual mark pitch when the slider 109 of the displacement detection apparatus is returned to detect the origin again.

Figure 6A:
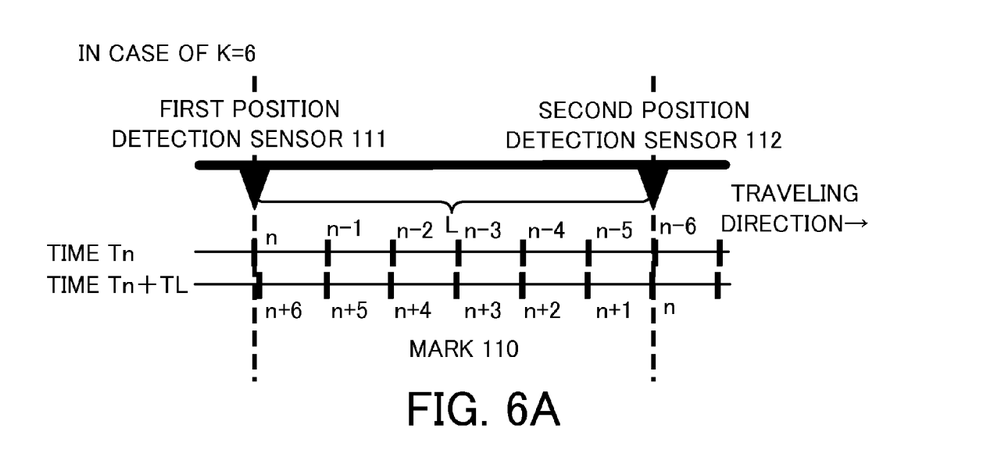
FIG. 6A is a diagram of a method of allocating a correction value of the mark pitch in the present embodiment.
Figure 6B:
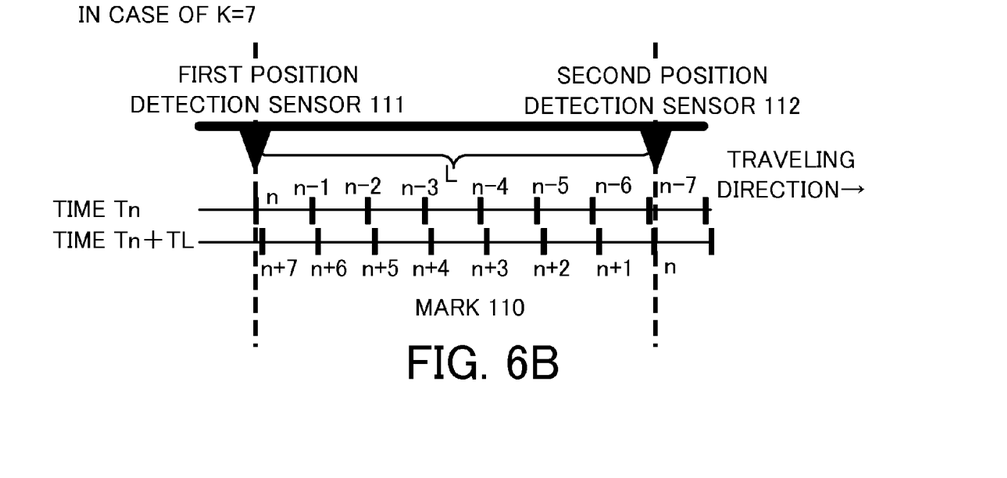
FIG. 6B is a diagram of a method of allocating a correction value of the mark pitch in the present embodiment.

Next, referring to FIGS. 6A and 6B, a method of allocating the correction value for a mark pitch to be applied will be described. FIGS. 6A and 6B are diagrams describing the method of allocating the correction value of the mark pitch. Generally, a velocity of a moving object controlled at a constant velocity at the time of passing a predetermined interval is obtained by averaging the velocities in accordance with positions in the interval with reference to a velocity when the moving object is positioned at a center of the predetermined interval, and is detected with a delay corresponding to half of the distance of the predetermined interval. Accordingly, the best configuration to minimize the error is that the averaged mark pitch provided by Expression (3) is allocated to a mark pitch corresponding to a center position of the distance L, i.e. a mark pitch of a center of mark pitches $P_n$ and $P_{n+K-1}$.

Referring to FIGS. 6A and 6B, a method of selecting a mark position where the correction value of the mark pitch described above is applied will be described. For easy understanding, a representative value K=6 (m=3) is used when K=2m (m is a positive integer), and a representative value K=7 (m=3) is used when K=2m+1 (m is a positive integer). As illustrated in FIG. 6A, when K is equal to 6 (K=6), the distance L substantially corresponds to one mark pitch. Therefore, only one mark pitch is a subject to apply the correction value.

Hereinafter, the relationship between L and K will be described. As described with reference to FIG. 5, a final mark that passes the first position sensor during the time $T_L$ in which the n-th mark passes the distance L is defined as the (n+K)th mark. The accumulated value of the mark pitches is $P_n+P_{n+1}+\ldots+P_{n+K-1}$, and this may be close to the distance L as illustrated in FIGS. 6A and 6B. Alternatively, the accumulated value $P_n+P_{n+1}+\ldots+P_{n+K}$ up to the (n+K+1)th mark positioned next to the final mark may be closer to the distance L. For example, a case in which the n-th mark to the (n+K)th mark pass the first position detection sensor during the time $T_L$ is considered. In this case, it is preferable that closer one of a sum of the mark pitch $P_n$ to the mark pitch $P_{n+K-1}$ and a sum of the mark pitch $P_n$ to the mark pitch $P_{n+K}$ is selected as the accumulated value of the mark pitches.

Actually, however, since the mark pitches $P_n$ to $P_{n+K-1}$ are not known before the measurement, K may be determined based on a value of K×P that is the closest value to the distance L in accordance with the relationship between the measured value of the distance L and the mark pitch P that is the nominal value. For example, a value of i on condition that a time $T_{Pi}$ from a time at which the n-th mark passes the first position detection sensor 111 until a time at which the (n+1)th mark passes the first position detection sensor 111 is the closest to the time $T_L$ is set to K. Alternatively, K that is determined by the value of K×P that is the closest value of the distance L may be used to perform the correction processing once and K is selected so as to be a value closest to the distance L again using the average value of the obtained correction pitch to perform a final correction processing.

In the present embodiment, a method of determining an accumulation number K based on the relationship between the mark pitch P and the distance L will be described. However, it is preferable that an appropriate method is selected in accordance with the condition because the accumulation accuracy may be influenced when the variation of the mark pitch P is strongly fluctuated for example. When the relationship between L and KP' may be changed in real time, sequential K+1 measured values $P_n$ may also be always obtained to determine the accumulation number K which is the closest to the distance L every time the mark passes, instead of previously fixing the accumulation number K.

Hereinafter, referring to FIGS. 6A and 6B, the allocation on condition that the accumulation number K is an even number or an odd number will be described. FIG. 6A illustrates a case where the accumulation number K is an even number (K=2m=6). The accumulated average value $(P_n+P_{n+1}+\ldots+P_{n+5})/6$ that is obtained in a case where seven marks from n to n+6 pass the first position detection sensor and six-period mark pitches from $P_n$ to $P_{n+5}$ are detected is used as a correction result of a center mark pitch $P_{n+2}$ or $P_{n+3}$. This correction result is allocated to one of the center mark pitch $P_{n+2}$ or $P_{n+3}$. It is preferable whether the correction result is allocated to $P_{n+2}$ or $P_{n+3}$ is determined based on the magnitude relation between the distance L and K×P described above. In other words, the correction result is allocated to $P_{n+3}$ that is closer to the center of the distance L when L>K×P is met, and on the other hand it is allocated to $P_{n+2}$ that is closer to the center of the distance L when L≦K×P is met.

When generalizing this, the correction value P' is applied to the (n+m)th mark pitch $P_{n+m}$ or the (n+m−1)th mark pitch $P_{n+m-1}$ when the accumulation number K is 2m (m is a positive integer). More preferably, the correction value P' is applied to the (n+m)th mark pitch $P_{n+m}$ when a time $T_{P2m}$ during which the n-th mark to the (n+2m)th mark pass the first position detection sensor 111 meets the relation of $T_{P2m} \leq T_L$. On the other hand, the correction value P' is applied to the (n+m−1)th mark pitch $P_{n+m-1}$ when the relation of $T_{P2m} > T_L$ is met.

In the present embodiment, the determination is performed using the mark pitch P that is a nominal value, but alternatively a correction processing is performed once for the mark pitch P to calculate the correction value P' that is a correction pitch based on the result of the correction processing and then the accumulation number K and the allocation mark position may also be revised based on the correction value P' using the determination method described above.

FIG. 6B illustrates a case where the accumulation number K is an odd number (K=2m+1=7). The accumulated average value $(P_n+P_{n+1}+\ldots+P_{n+6})/7$ that is obtained in a case where eight marks from n to n+7 pass the first position detection sensor and seven-period mark pitches from $P_n$ to $P_{n+6}$ are detected is allocated as a correction result of a center mark pitch $P_{n+3}$. When generalizing this, the correction value P' is applied to the (n+m)th mark pitch $P_{n+m}$ when the accumulation number K is 2m+1 (m is a positive integer). When the accumulation number K is an odd number, specifically the approach performed in the case of the even number is not necessary because a period mark is basically disposed at a center of the distance L. Thus, using Expression (3), the calculated correction value P' is allocated to the center mark pitch. As above, the method of processing the pitch correction in the present embodiment has been described.

Subsequently, a verification result by a simulation of the accumulated position correction in the correction processing method described above will be described. It is assumed that the simulation condition is L=10 mm, P=100 μm, and K=100, and the accumulated position error which is generated by the movement of 200 mm on condition that an error of a maximum of 1 μm is contained in each mark pitch is calculated. A condition that a high-frequency variation of 0.5 mm/s for the moving velocity of 200 mm/s occurs at the time of the correction processing operation is also adopted.

Figure 7A:
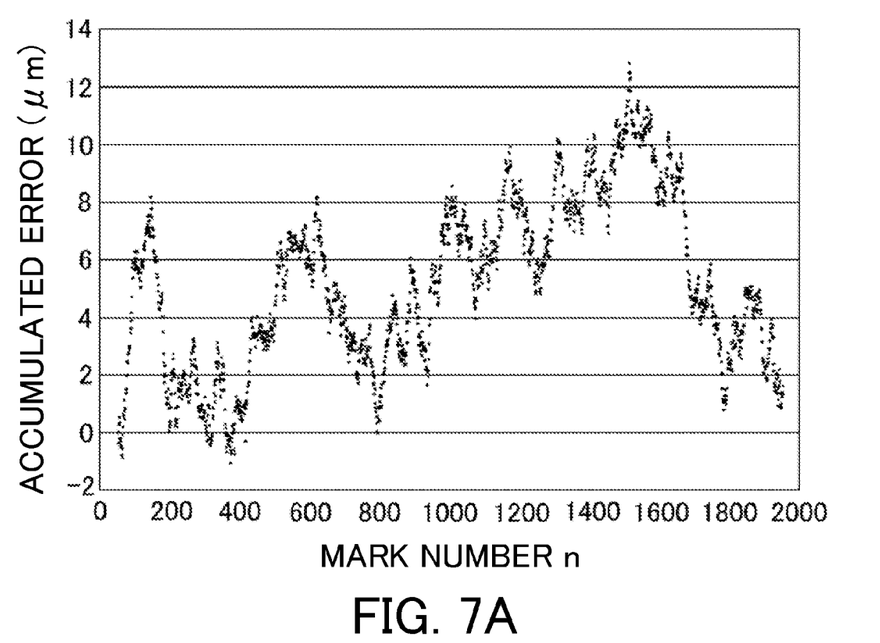
FIG. 7A is a graph illustrating an accumulated error of the mark pitch and a correction effect in the present embodiment.
Figure 7B:
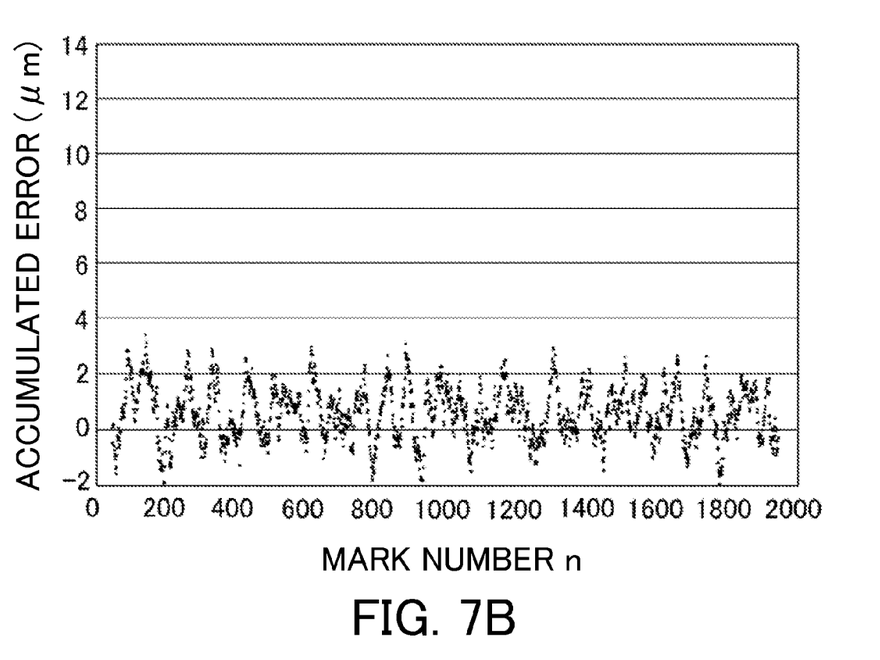
FIG. 7B is a graph illustrating an accumulated error of the mark pitch and a correction effect in the present embodiment.

The accumulated position error is obtained by calculating a difference of 100×P from an accumulated value of sequential 100 mark pitches to be totally accumulated from the first mark. FIG. 7A illustrates the accumulated position error, and FIG. 7B is a graph illustrating an improvement effect of the accumulated position error by applying the correction value obtained by performing the pitch correction processing of the present embodiment. In each of FIGS. 7A and 7B, a lateral axis indicates a mark number n (corresponding to 100 μm for n=1), and a vertical axis indicates an accumulated position error (μm) until 2000th mark passes after the origin detection. In this case, a high-frequency variation of 0.5 mm/s is generated for the velocity variation of 200 mm/s. According to this simulation result, the accumulated error of the displacement amount caused by the mark pitch error is reduced half by performing the method of the present embodiment.

Since the correction value obtained by averaging the accumulated mark pitch obtained from Expression (3) described above is used as the correction value P' of a single mark pitch P, it is not individually true pitch information. However, because the accumulated value of K mark pitches represented as the following Expression (4) is an approximated value closer than an actual value, it is a value close to a true value compared with the displacement amount in a long interval.

$$\sum_{i=1}^{K} P_{n+i-1} \tag{4}$$

With regard to the two position detection sensors, technically, L and P can be set to the same value by disposing light receiving elements each having a size of around tens of micrometers adjacent to each other. In other words, if the accumulation calculation is not performed (K=1), a configuration in which the pitch error is not averaged as described above can be considered. In this case, the processor 409 calculates a moving distance $T_{PK}L/T_L$ (K=1) of the n-th mark during a time $T_{PK}$ (K=1) to correct a position error at an arbitrary position on the scale 115 when K=1 or L<P is met.

Figure 8:
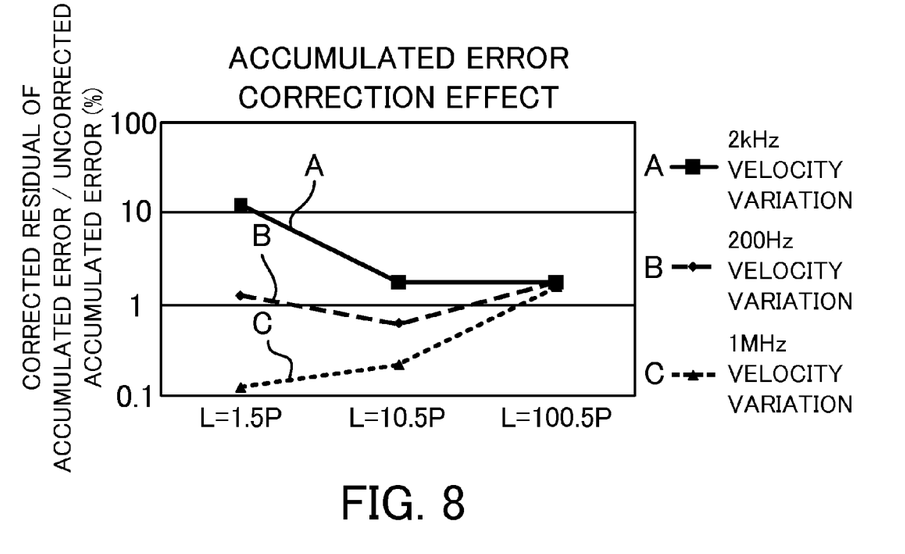
FIG. 8 is a graph illustrating a variation of the mark pitch and an error correction effect of the mark pitch on condition that a velocity variation exists in the present embodiment.

Next, referring to FIG. 8, a case in which the mark pitch variation and the velocity variation exist at the same time will be described. FIG. 8 is a graph illustrating an error correction effect of the mark pitch when the mark pitch variation and the velocity variation exist. In FIG. 8, an accumulated error correction effect is compared on condition that the relation between L and P meets L=1.5 P, L=10.5 P, and L=100.5 P. The relation between L and P is not an integral multiple because the reality is that L is not generally an integral multiple of P and the error is generated by the selection of K in this case. In FIG. 8, the lateral axis indicates L=1.5 P, L=10.5 P, and L=100.5 P in order from the left, and the vertical axis indicates an improvement ratio before and after the correction (a corrected residual of an accumulated error/an uncorrected accumulated error (%)). As the numerical value is smaller, the correction effect is well obtained.

In FIG. 8, a solid line A indicates a result of a case in which the variation of 2 kHz exists with amplitude of 2 mm/s for a velocity of 200 mm/s. A dashed line B indicates a result of a case in which the variation of 200 Hz exists with amplitude of 10 mm/s for the velocity of 200 mm/s. A dotted line C indicates a result of a case in which the high-frequency variation (1 MHz) by a white noise with amplitude of 0.5 mm/s for the velocity of 200 mm/s. The pitch variation has amplitude of 1 μm for P=100 μm, and is a variation of a two-cycle gentle sine wave in the interval of 200 mm. As a result, since the determination result as to whether it is right or wrong for the distance L is changed in accordance with a variation parameter, it is preferable that the distance L is set in accordance with a state of the system of the displacement detection apparatus such as the pitch variation or the velocity variation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, on condition that a measurement system in which the velocity variation in the constant velocity control at the time of the correction processing is extremely small is used, the error can be allocated in accordance with the time required for passing the mark pitch to bring the individual mark pitch $P_n$ close to a true value compared with a case of the addition average.

In the present embodiment, the origin detection sensor 108 and the origin detection processor 404 accompanying it are used in order to define the mark number n, but a configuration of defining the mark number n using an absolute encoder in which a code specifying an absolute position is associated with the mark 110 itself may also be adopted. In this case, the processor 409 can relate a specific mark to the absolute position of the absolute encoder. When the absolute encoder is used, it is not necessary to provide the origin mark 107 for specifying a position, the origin detection sensor 108, and the origin detection processor 404.

In the present embodiment, the linear displacement detection apparatus 100 is referred, and the error caused by the velocity variation can be reduced using a method of measuring each corrected mark pitch plural times to average them while the slider 109 performs a reciprocating movement. As a round movement of a copier or a transfer belt of an LBP, for example an encoder that repeatedly measures the same position or a rotary encoder having a disk-shaped scale that performs a round movement in which the same mark 110 is repeatedly passed can reduce the error by averaging a plurality of correction values of the same mark pitches. Furthermore, as seen in a liner printer, when a print state and a non-print state are separately provided in accordance with the reciprocating movement of the head, an error reduction effect can also be expected in that the correction data in a movement direction at a stable speed are accumulated to apply the sequentially-updated correction data to perform the position detection.

Even if there is no repeat operation, similarly to the case where the accumulated correction value is obtained by the first position detection sensor as described above, the accumulated correction value can be obtained by the second position detection sensor. Therefore, the error reduction effect can also be obtained by the averaging process. In this case, the processor 409 uses a time $T_{PK2}$ (a third time $T_{PK2}$) required for the K marks in the distance L to pass the detection position by the second position detection sensor 112 and a time $T_{L2}$ (a fourth time $T_{L2}$) required for a specific mark to move the distance L. The processor 409 calculates a correction value P''' of a mark pitch P of a plurality of marks using the distance L, the time $T_{PK2}$, and the time $T_{L2}$ to apply an average value of the correction value P' and the correction value P''' to the mark pitch P. The error reduction effect by averaging the plurality of correction values of the same mark pitch at a different time is effective even in a case where an appropriate error correction is not performed because a velocity variation greater than envisioned during the correction processing operation is generated.

The storage 408 that stores the mark pitch P may be provided in a volatile memory that are disposed in the signal processor of each position detection sensor, or may also be provided as an external storage device such as a PC connected with an external unit. Since this storage area can be freely rewritten and always update the correction value to a new one by the correction processing method described above even if it the environment of the displacement detection apparatus is changed, the displacement detection apparatus with high accuracy can be provided.

Even if the expansion of the distance L itself of the position detection sensors or the expansion of the mark pitch of the scale caused by a thermal expansion is generated, a temperature correction of the interval can be performed based on a thermal expansion temperature coefficient contributing to the distance L. A linear expansion coefficient (a thermal expansion coefficient) of a fixed substrate on which two position detection sensors are mounted is defined as $C_s$/deg C. A position detection sensor interval L is $L_0$ at an initial temperature $T_0$, and is $L_0(1+C_s(T_S-T_0))$ at a temperature $T_S$ at the time of the measurement. This is applied to Expression (3) to obtain a true mark pitch P' by the correction processing considering the temperature dependency of the position detection sensor interval L.

The scale of the present embodiment may also be an endless scale used for the displacement detection apparatus (an endless scale). In this case, the processor can use an average value of a plurality of error estimation amounts as a correction amount of the mark pitch in accordance with the number of passing times of the same mark that is disposed on the endless scale used for the displacement detection apparatus.

There is a case where the accuracy of the correction value P' is deteriorated due to the variation of the distance L since each position detection sensor or peripheral parts are made of a material with a thermal expansion and expand and contract. Therefore, it is preferable that the residual error of the correction value P' depending on the temperature is reduced by correcting the thermal expansion coefficient of the material of each position detection sensor or the peripheral parts contributing to the distance L by the addition of the temperature difference for the distance L. In this case, the processor corrects the distance L based on the thermal expansion coefficient of the material of the first position detection sensor, the second position detection sensor, or the peripheral parts to be able to determine the correction value P'.

According to the present embodiment, the accumulated error of the displacement amount that is generated by the accumulation of the error factor caused by the fabrication accuracy or the mounting accuracy of the scale or the accumulation of the error factor caused by the expansion of the scale member along with the environment change such as a temperature or a humidity can be estimated by the previously-measured distance L of two position detection sensors. Therefore, the construction of an ideal evaluation system with highly-accurate mark pitch is not necessary, and the accumulated error value of the encoder can be directly measured with reference to the distance L on the implementation system. Furthermore, even if the expansion of the distance L itself or the expansion of the mark pitch of the scale is generated by the thermal expansion, the temperature correction of the interval can be performed based on the thermal expansion temperature coefficient contributing to the distance L. Therefore, the inexpensive and highly-accurate displacement detection apparatus and the error correction method of the scale used for the displacement detection apparatus can be provided.

The present invention is for example applicable to a device that requires performing a linear displacement detection of a long stroke with high accuracy. Specifically, the present invention is usable for a machine tool that fabricates a large-size object, a manufacturing apparatus of a liquid crystal panel, a positioning apparatus of a conveyer belt of an automation line in a factory of manufacturing parts, an orthogonal coordinate three-axis robot, and a print head of a large-size ink-jet printer. As an apparatus using a position control apparatus of a carriage feed drive or an endless belt, the present invention is also used for a position control portion of a paper feeding drive using a belt such as a copier or a printer.

This application claims the benefit of PCT International Application No. PCT/JP2011/000249 filed on Jan. 19, 2011, which is hereby incorporated by reference herein in its entirety.

What is claimed is:

1. A displacement detection apparatus comprising:
a scale on which a plurality of marks are periodically disposed;
a first position detection sensor and a second position detection sensor configured to detect positions of the marks; and
a processor configured to perform a calculation processing of an output signal from each of the first position detection sensor and the second position detection sensor,
wherein the first position detection sensor and the second position detection sensor are disposed at a distance L from each other in a relative movement direction so as to be movable relative to the scale, and
wherein the processor calculates a correction value P' of a mark pitch P of the plurality of marks using the distance L, a first time $T_{PK}$ required for K marks of the plurality of marks to pass a detection position by one of the first position detection sensor and the second position detection sensor, and a second time $T_L$ required for a specific mark of the plurality of marks, which is measured at the same time of the measurement of the first time $T_{PK}$, to move the distance L.

2. The displacement detection apparatus according to claim 1,
wherein the processor multiplies a moving distance $T_{PK}L/T_L$ in the first time $T_{PK}$ at a moving velocity $L/T_L$ in the second time $T_L$ by $1/K$ to calculate the correction value P' of the mark pitch P.

3. The displacement detection apparatus according to claim 1,
wherein the processor multiplies a moving distance $T_{PK}L/T_L$ in the first time $T_{PK}$ by $T_P/T_{PK}$ using a passing time $T_P$ of a predetermined mark pitch P to calculate the correction value P' of the mark pitch P.

4. The displacement detection apparatus according to claim 1,
wherein the processor sets a value of i on condition that a time $T_{Pi}$ from a time at which an n-th mark passes the first position detection sensor until a time at which an (n+1)th mark passes the first position detection sensor is the closest to the time $T_L$ to K.

5. The displacement detection apparatus according to claim 1,
wherein the processor applies the correction value P' to one of an (n+m)th mark pitch $P_{n+m}$ and an (n+m−1)th mark pitch $P_{n+m-1}$ when the K is 2m, where m is a positive integer.

6. The displacement detection apparatus according to claim 5,
wherein the processor applies the correction value P' to the (n+m)th mark pitch $P_{n+m}$ when a time $T_{P2m}$ in which an n-th mark to an (n+2m)th mark pass the first position detection sensor meets a relation of $T_{P2m} \leq T_L$, and applies the correction value P' to the (n+m−1)th mark pitch $P_{n+m-1}$ when the time $T_{P2m}$ meets a relation of $T_{P2m} > T_L$ on condition that the K is 2m, where m is a positive integer.

7. The displacement detection apparatus according to claim 1,
wherein the processor applies the correction value P' to an (n+m)th mark pitch $P_{n+m}$ when the K is 2m+1, where m is a positive integer.

8. The displacement detection apparatus according to claim 1,
wherein the processor calculates a moving distance $T_{PK}L/T_L$ (K=1) of an n-th mark in the first time $T_{PK}$ (K=1) to correct a position error of an arbitrary position on the scale when the K is 1 or L<P.

9. The displacement detection apparatus according to claim 1, further comprising:
an origin mark disposed on the scale or adjacent to the scale; and
an origin detection sensor configured to detect a position of the origin mark,
wherein the processor sets a mark number n of a mark detected by the first position detection sensor for the first time after a position of the origin mark is detected by the origin detection sensor to 1, and adds one by one to the mark number n in order of subsequent marks detected sequentially to specify positions of the plurality of marks.

10. The displacement detection apparatus according to claim 9,
wherein the origin mark is configured by at least one of a luminous body, a reflector, a magnetic material, and a charged body.

11. The displacement detection apparatus according to claim 1,
wherein the displacement detection apparatus is used as an absolute encoder, and wherein the processor relates the specific mark to an absolute position of the absolute encoder.

12. The displacement detection apparatus according to claim 1,
wherein the displacement detection apparatus performs an error correction by a reciprocating operation of a relative movement repeatedly between the first position detection sensor and the second position detection sensor and the scale to use an average value of a plurality of correction results as the correction value P'.

13. The displacement detection apparatus according to claim 1,
wherein the first time $T_{PK}$ is a time required for the K marks to pass a detection position by the first position detection sensor, and
wherein the processor calculates a correction value P" of the mark pitch P of the plurality of marks using a third time $T_{PK2}$ required for the K marks to pass a detection position by the second position detection sensor and a fourth time $T_{L2}$ required for the specific mark to move the distance L to apply an average value of the correction value P' and the correction value P" to the mark pitch P.

14. The displacement detection apparatus according to claim 1,
wherein the scale is an endless scale, and
wherein the processor uses an average value of a plurality of error estimation amounts as the correction value P' in accordance with the number of passing times of the same mark disposed on the endless scale.

15. The displacement detection apparatus according to claim 1,
wherein the processor corrects the distance L based on a thermal expansion coefficient of a material of the first position detection sensor and the second position detection sensor to determine the correction value P'.

16. A method of correcting an error of a scale used for a displacement detection apparatus on which a plurality of marks are periodically disposed, the method comprising:
detecting a position of the marks using a first position detection sensor and a second position detection sensor that are disposed at a distance L from each other in a relative movement direction so as to be movable relative to the scale used for the displacement detection apparatus;
performing a calculation processing of an output signal from each of the first position detection sensor and the second position detection sensor; and
calculating a correction value P' of a mark pitch P of the plurality of marks using the distance L, a first time $T_{PK}$ required for K marks of the plurality of marks to pass a detection position by one of the first position detection sensor and the second position detection sensor, and a second time $T_L$ required for a specific mark of the plurality of marks, which is measured at the same time of the measurement of the first time $T_{PK}$, to move the distance L.

* * * * *